United States Patent
Immendorf et al.

(10) Patent No.: US 9,819,441 B2
(45) Date of Patent: Nov. 14, 2017

(54) METHOD FOR UPLINK JAMMER DETECTION AND AVOIDANCE IN LONG-TERM EVOLUTION (LTE) NETWORKS

(71) Applicant: EDEN ROCK COMMUNICATIONS, LLC, Bothell, WA (US)

(72) Inventors: Chaz Immendorf, Bothell, WA (US); Jungnam Yun, Bothell, WA (US); Eamonn Gormley, Bothell, WA (US)

(73) Assignee: SPECTRUM EFFECT, INC., Seattle, WA (US)

( * ) Notice: Subject to any disclaimer, the term of this patent is extended or adjusted under 35 U.S.C. 154(b) by 328 days.

(21) Appl. No.: 14/160,447

(22) Filed: Jan. 21, 2014

(65) Prior Publication Data
US 2014/0206343 A1    Jul. 24, 2014

Related U.S. Application Data

(60) Provisional application No. 61/755,431, filed on Jan. 22, 2013, provisional application No. 61/754,713, filed on Jan. 21, 2013.

(51) Int. Cl.
*H04W 4/00* (2009.01)
*H04K 3/00* (2006.01)
*H04W 48/02* (2009.01)
*H04W 24/04* (2009.01)

(52) U.S. Cl.
CPC .............. *H04K 3/226* (2013.01); *H04K 3/22* (2013.01); *H04W 24/04* (2013.01); *H04W 48/02* (2013.01)

(58) Field of Classification Search
CPC .............................. H04W 48/02; H04W 24/04
USPC ................... 370/252; 455/422.1, 423, 434
See application file for complete search history.

(56) References Cited

U.S. PATENT DOCUMENTS

| | | | | |
|---|---|---|---|---|
| 5,708,975 A | * | 1/1998 | Heiskari | H04W 72/082 455/1 |
| 2011/0122761 A1 | | 5/2011 | Sriram | |
| 2012/0032854 A1 | * | 2/2012 | Bull | G01S 5/0215 342/450 |
| 2012/0129517 A1 | * | 5/2012 | Fox | H04L 41/5025 455/425 |
| 2012/0157089 A1 | | 6/2012 | Yang et al. | |

(Continued)

FOREIGN PATENT DOCUMENTS

JP    2012-114916 A    6/2012

OTHER PUBLICATIONS

International Search Report and Written Opinion for PCT/US2014/012402, filed Jan. 21, 2014.

(Continued)

*Primary Examiner* — Charles Appiah
*Assistant Examiner* — Jaime Holliday

(57) ABSTRACT

A method for handling a jamming signal in a wireless network includes obtaining network measurement data collected by a wireless network element. A first performance information relating to a Key Performance Indicator, data collected during a quiet time, or a report on a bogus Physical Random Access Channel signal, or a combination thereof, is selected from the network measurement data. The first performance information is examined with respect to a first reference information. An action is initiated if the examination of the first performance information indicates the presence of a potential jamming signal.

17 Claims, 15 Drawing Sheets

(56) References Cited

U.S. PATENT DOCUMENTS

| | | | | |
|---|---|---|---|---|
| 2012/0281580 A1* | 11/2012 | Lee | ................... | H04W 74/008 |
| | | | | 370/252 |
| 2012/0295609 A1 | 11/2012 | Li et al. | | |
| 2013/0223241 A1* | 8/2013 | Zhang | ................... | H04L 27/26 |
| | | | | 370/252 |
| 2014/0038536 A1* | 2/2014 | Welnick | ............... | H04B 1/1027 |
| | | | | 455/154.1 |

OTHER PUBLICATIONS

Ericsson, "Standarization scope for KPIs in LTE", 3GPP TSG RAN WG2, Feb. 11-15, 2008, pp. 1-3, No. 61, R2-080758, Sorrento, Italy. (http://www.3gpp.org/DynaReport/TDocExMtg-R2-61--26785.htm).

* cited by examiner

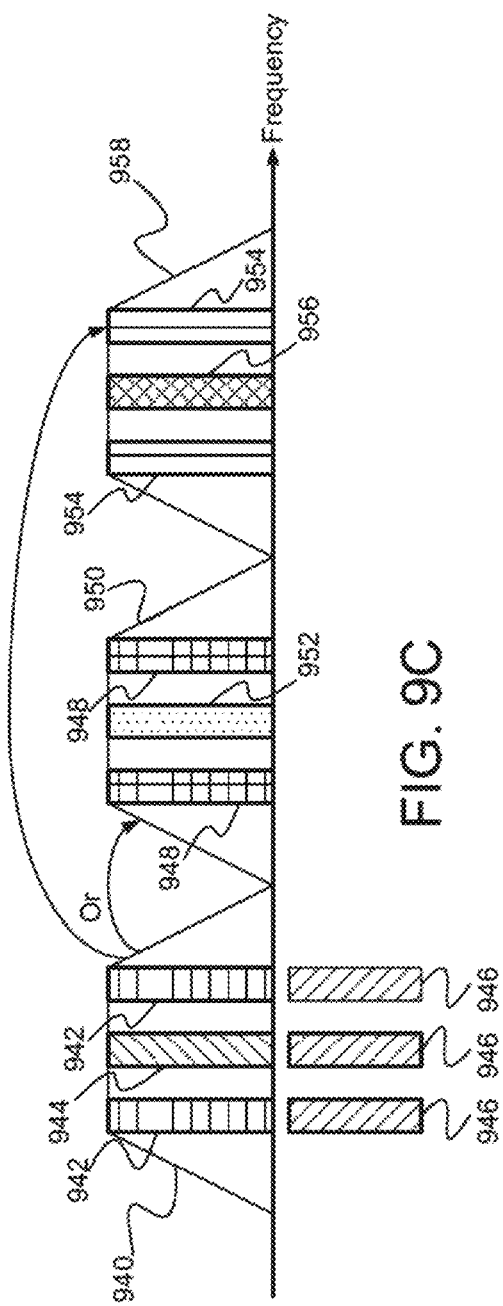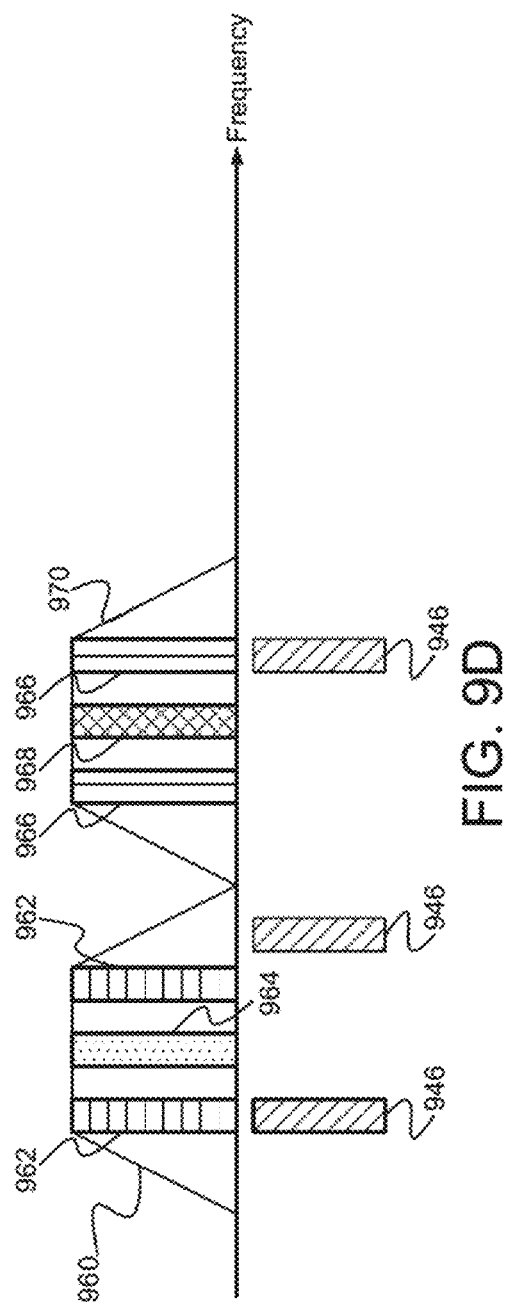

METHOD FOR UPLINK JAMMER DETECTION AND AVOIDANCE IN LONG-TERM EVOLUTION (LTE) NETWORKS

CROSS-REFERENCES TO RELATED APPLICATIONS

The present invention claims priority to and is a non-provisional of U.S. Application No. 61/754,713, filed Jan. 21, 2013, and U.S. Application No. 61/755,431, filed Jan. 22, 2013, which are incorporated by reference for all purposes.

BACKGROUND

Wireless data communication operators often expend significant resources in order to license and broadcast over a dedicated communications frequency spectrum. Theoretically, this license awards the operator exclusive access to the licensed spectrum across a specific geographic region or area. Based on their exclusive rights, operators may advantageously plan where and how they wish to allocate network resources, including, but not limited to: network controllers (e.g., network switching centers and/or network managers), databases, base stations, gateways, signal repeaters, etc. Operators within a network may also use their proprietary rights to determine which frequencies to employ at each base station within a particular network topology. In this way, licensed operators can effectively optimize the design of their data communications networks to maximize system integrity and throughput.

In the case of high-bandwidth Long-Term Evolution (LTE) wireless communications networks, the networks may be vulnerable to deliberate jamming signals designed to attack specific frequency and time resources for a portion of the frequency bandwidth, such as control channels and random access channels in an uplink. An inexpensive jamming signal device can transmit in the timeslots and frequencies used for these channels, rendering the channels unusable. Unless these jamming signals are detected and avoided, users in a wide area around the jamming signal may experience a Denial of Service.

BRIEF SUMMARY

In an embodiment, a method for handling a jamming signal in a wireless network includes obtaining network measurement data collected by a wireless network element. A first performance information relating to a Key Performance Indicator, data collected during a quiet time, or a report on a bogus Physical Random Access Channel signal, or a combination thereof, is selected from the network measurement data. The first performance information is examined with respect to a first reference information. An action is initiated if the examination of the first performance information indicates the presence of a potential jamming signal.

According to an embodiment, a method for handling a jamming signal in a wireless network includes obtaining network measurement data collected by a wireless network element; selecting a first performance information from the network measurement data obtained, the first performance information relating to a Key Performance Indicator (KPI), data collected during a quiet time, or a report on bogus Physical Random Access Channel (PRACH) signal, or a combination thereof; examining the first performance information with respect to a first reference information; and initiating an action if the examination of the first performance information indicates a presence of a potential jamming signal.

In an embodiment, in a method for handling a jamming signal in a wireless network, the first performance information relates to a Key Performance Indicator (KPI) and the wireless network is a Long-Term Evolution (LTE) network, and the method further includes selecting a second performance information from the network measurement data obtained, the second performance information relating to the data collected during the quiet time, the quiet time being a time period when a base station is instructed not to schedule uplink transmissions on a particular set of frequencies; examining the second performance information with respect to a second reference information, the second reference information relating to a known signal characteristic of a wireless device; and initiating an action if the examination of the second performance information indicates a presence of a potential jamming signal.

In an embodiment, in a method for handling a jamming signal in a wireless network, the first performance information relates to a Key Performance Indicator (KPI) and the wireless network is a Long-Term Evolution (LTE) network, the KPI is one selected from the following: a cell throughput for a region; a PRACH detection failure rate for a region; a PRACH random access failure rate for a region; and a PUSCH reception failure rate, and the action initiated is issuing of an alert to indicate a presence of a potential jamming signal.

In an embodiment, in a method for handling a jamming signal in a wireless network, the first performance information relates to a Key Performance Indicator (KPI) and the wireless network is a Long-Term Evolution (LTE) network, and the first reference information is a threshold value based on historical KPI data.

In an embodiment, in a method for handling a jamming signal in a wireless network, the potential jamming signal is a potential uplink transmission jamming signal, and the method further includes obtaining additional network measurement data if the examination of the first performance information indicates the presence of the potential jamming signal; and determining whether or not the potential uplink transmission jamming signal is a jamming signal based on the additional network measurement data.

In an embodiment, in a method for handling a jamming signal in a wireless network, the method further includes updating the first reference information if the potential uplink transmission jamming signal is determined not to be a jamming signal.

In an embodiment, in a method for handling a jamming signal in a wireless network, the action initiated is issuing of an alert to indicate a presence of a potential jamming signal, and the method further includes: locating a source of the potential uplink transmission jamming signal; and reconfiguring the wireless network if the potential uplink transmission jamming signal is determined to be a jamming signal.

In an embodiment, in a method for handling a jamming signal in a wireless network, the jamming signal is a PUCCH signal, a PRACH signal, white noise, or a combination thereof.

In an embodiment, in a method for handling a jamming signal in a wireless network, the action initiated is issuing of an alert to indicate a presence of a potential jamming signal, and the quiet time relates to a time period when a base station is instructed not to schedule uplink transmissions on a particular set of frequencies.

According to an embodiment, a system for handling a jamming signal in a wireless network includes a processor; and a non-transitory computer readable medium with computer executable instructions stored thereon which, when executed by the processor, perform a method including obtaining network measurement data collected by a wireless network element; selecting a first performance information from the network measurement data obtained, the first performance information relating to a Key Performance Indicator (KPI), data collected during a quiet time, or a report on bogus Physical Random Access Channel (PRACH) signal, or a combination thereof; examining the first performance information with respect to a first reference information; and initiating an action if the examination of the first performance information indicates a presence of a potential jamming signal.

In an embodiment, in a system for handling a jamming signal in a wireless network, the network measurement data are obtained from a plurality of wireless network elements including a base station and a mobile station.

In an embodiment, in a system for handling a jamming signal in a wireless network, the system includes a Jamming Detection and Location Server and the non-transitory computer readable medium is provided in the Jamming Detection and Location Server.

In an embodiment, in a system for handling a jamming signal in a wireless network, the first performance information relates to a Key Performance Indicator (KPI), and the first reference information relates to a threshold value based on historical KPI data, and the method further includes selecting a second performance information from the network measurement data obtained, the second performance information relating the data collected during the quiet time, the quiet time being a time period when a base station is instructed not to schedule uplink transmissions on a particular set of frequencies; examining the second performance information with respect to a second reference information, the second reference information relating to a signal characteristic of a known wireless device; and initiating an action if the examination of the second performance information indicates a presence of a potential jamming signal.

In an embodiment, in a system for handling a jamming signal in a wireless network, the potential jamming signal is a potential uplink transmission jamming signal, and the method further includes obtaining additional network measurement data if the examination of the first performance information indicates the presence of the potential jamming signal; determining whether or not the potential uplink transmission jamming signal is a jamming signal based on the additional network measurement data.

In an embodiment, in a system for handling a jamming signal in a wireless network, the method further includes updating the first reference information if the potential uplink transmission jamming signal is determined not to be a jamming signal.

In an embodiment, in a system for handling a jamming signal in a wireless network, the action initiated is issuing of an alert to indicate a presence of a potential jamming signal, and the method further includes locating a source of the potential uplink transmission jamming signal; and reconfiguring the wireless network if the potential uplink transmission jamming signal is determined to be a jamming signal.

In an embodiment, in a system for handling a jamming signal in a wireless network, the jamming signal is a PUCCH signal, a PRACH signal, white noise, or a combination thereof.

According to an embodiment, a non-transitory computer readable medium with computer executable instructions stored thereon which, when executed by a processor, perform a method including: obtaining network measurement data collected by a wireless network element; selecting a first performance information from the network measurement data obtained, the first performance information relating to a Key Performance Indicator (KPI), data collected during a quiet time, or a report on bogus Physical Random Access Channel (PRACH) signal, or a combination thereof; examining the first performance information with respect to a first reference information; and initiating an action if the examination of the first performance information indicates a presence of a potential jamming signal.

In an embodiment, in a non-transitory computer readable medium with computer executable instructions stored thereon, the first performance information relates to a Key Performance Indicator (KPI) and the wireless network is a Long-Term Evolution (LTE) network, and the method further includes selecting a second performance information from the network measurement data obtained, the second performance information relating the data collected during the quiet time, the quiet time being a time period when a base station is instructed not to schedule uplink transmissions on a particular set of frequencies; examining the second performance information with respect to a second reference information, the second reference information relating to a signal characteristic of a known wireless device; and initiating an action if the examination of the second performance information indicates a presence of a potential jamming signal.

BRIEF DESCRIPTION OF THE DRAWINGS

In the detailed description that follows, embodiments are described as illustrations only since various changes and modifications will become apparent to those skilled in the art from the following detailed description.

FIGS. 9C and 9D illustrate frequency reassignment and splitting according to an embodiment.

DETAILED DESCRIPTION

Figure 1:
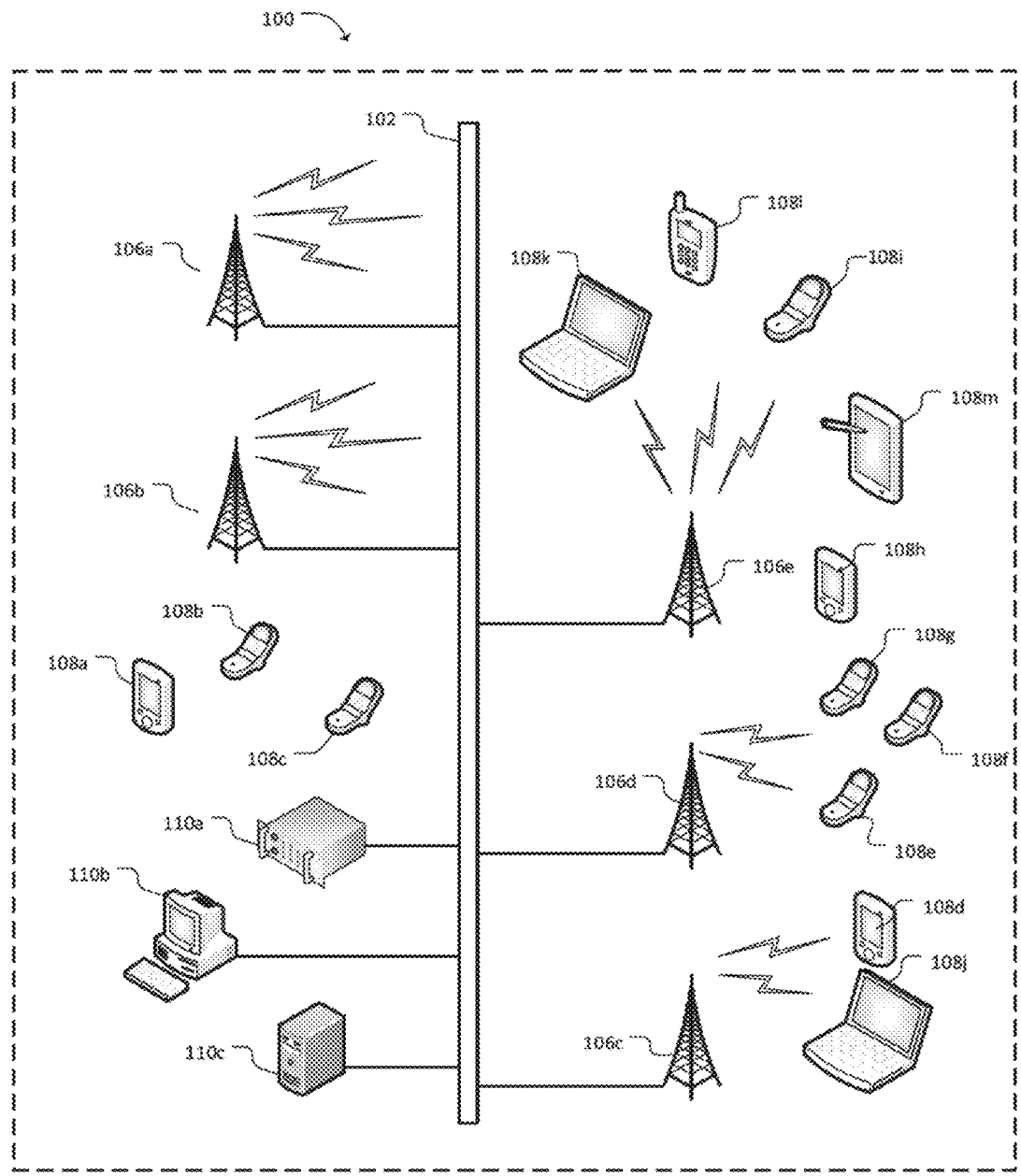
FIG. 1 illustrates a networked computing system according to an embodiment of this disclosure.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

FIG. 1 illustrates a networked computing system 100 according to an embodiment of this disclosure. As depicted, system 100 includes a data communications network 102, one or more base stations (or eNodeBs) 106a-e, one or more network controller devices 110a-c, and one or more User Equipment (UE) 108a-m. As used herein, the term "base station" refers to a wireless communications station provided in a location that serves as a hub of a wireless network. The base stations include macrocells, microcells, picocells, and femtocells. The term "network controller device" refers to a device that manages the resources of a network. The network controller devices include Network Resource Controllers (NRCs), where the NRCs include conventional NRCs and self-organizing network (SON) controllers that can perform self-configuration, self-optimization and/or self-healing. The term "user equipment" refers to any device used directly by an end-user. The user equipment includes mobile phones, laptop computers, tablets, hand-held electronic devices with wireless communication capabilities, or the like. The terms such as "mobile station," "mobile device," "mobile terminal," "subscriber device," "subscriber," or the like, are used interchangeably with the term "user equipment."

In system 100, the data communications network 102 may include a backhaul portion that can facilitate distributed network communications between any of the network controller devices 110a-c and any of the base stations 106a-e. Any of the network controller devices 110a-c may be a dedicated NRC that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's data communications network 102 (e.g., via a point of presence).

In an embodiment, an NRC (such as a SON controller) has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in the computer readable media such as volatile or non-volatile memories of one or more communicating device(s) within the networked computing system 100.

In an embodiment, any of the network controller devices 110a-c and/or base stations 106a-e may function independently or collaboratively to implement any of the processes associated with various embodiments of the present disclosure. In a standard LTE network, any of the network controller devices 110a-c (optionally having NRC functionality) may be associated with a base station (or eNodeB), a mobility management entity (MME), or any other common network controller device known in the art, such as a Radio Resource Manager (RRM) that is described in U.S. Pat. No. 8,229,368, which is incorporated herein by reference.

In a wireless network, the number of UEs attached to a particular base station is a function of the number of active users in the base station's coverage area. If a large number of users are closer to a particular base station than its neighbors, the particular base station may have a larger number of UEs attached to it than its neighbors do, even though some of the UEs are within service range of the neighboring base stations. For example, with reference to elements of FIG. 1, base station 106a has fewer active attached UE than neighboring base stations 106b and 106e.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
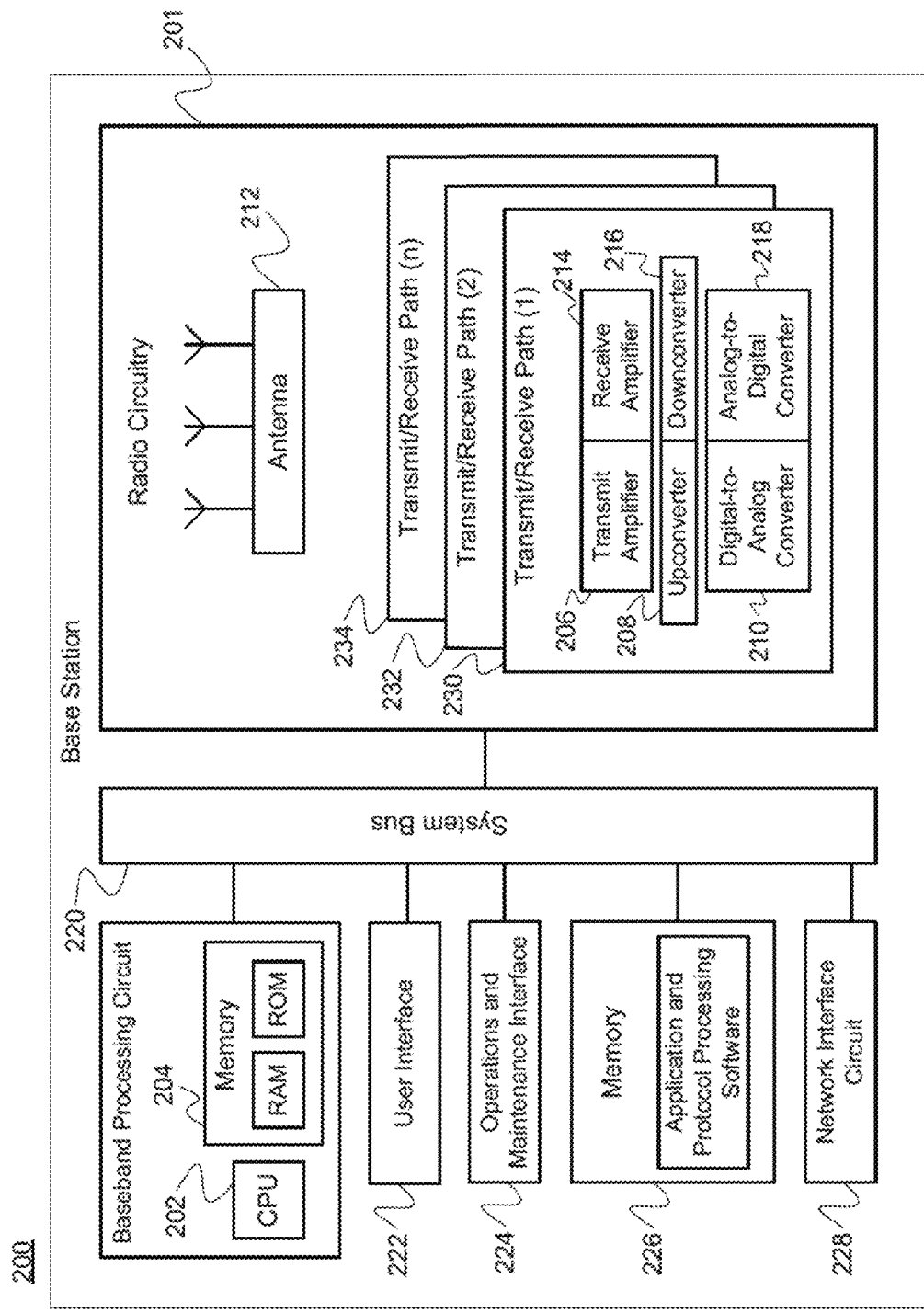
FIG. 2 illustrates an exemplary block diagram of a base station.

FIG. 2 illustrates a block diagram of a base station 200 (e.g., a femtocell, picocell, microcell or macrocell) according to an embodiment. The base station 200 may be representative of the base stations 106a-e in FIG. 1. In an embodiment, the base station 200 includes a baseband processing circuit including at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

The base station 200 includes radio circuitry 201 for transmitting and receiving data to and from the network. The radio circuitry 201 may include a transmit path including a digital-to-analog converter 210 for converting digital signals from a system bus 220 into analog signals to be transmitted, an upconverter 208 for setting the frequency of the analog signal, and a transmit amplifier 206 for amplifying analog signals to be sent to the antenna 212 and transmitted as signals. In addition, the radio circuitry 201 may include a receive path including the receive amplifier 214 for amplifying signals received by the antenna 212, a downconverter 216 for reducing the frequency of the received signals, and an analog-to-digital converter 218 for outputting the received signals onto the system bus 220. The system bus 220 facilitates data communication amongst the hardware resources of the base station 200. There may be any number of transmit/receive paths 230, 232, and 234 comprising multiple digital-to-analog converters, upconverters, and transmit amplifiers as well as multiple analog-to-digital converters, downconverters, and receive amplifiers according to implementation. Additionally, antenna 212 may include multiple physical antennas for transmitting beamformed communications. In an embodiment, the base station 200 may include certain functionality associated with the network controller devices 110a-c including a Jamming Detection and Location Server whose functionality is explained in more detail below in connection with FIG. 7 through FIG. 11.

The base station 200 may also include a user interface 222, an operations and maintenance interface 224, memory 226 storing application and protocol processing software, and a network interface circuit 228 facilitating communication across the LAN and/or WAN portions of a backhaul network (e.g., data communications network 102 in FIG. 1).

In an embodiment, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). In an embodiment, the base station 200 is configured to communicate with UEs 108a-m via LTE protocol.

Figure 3A:
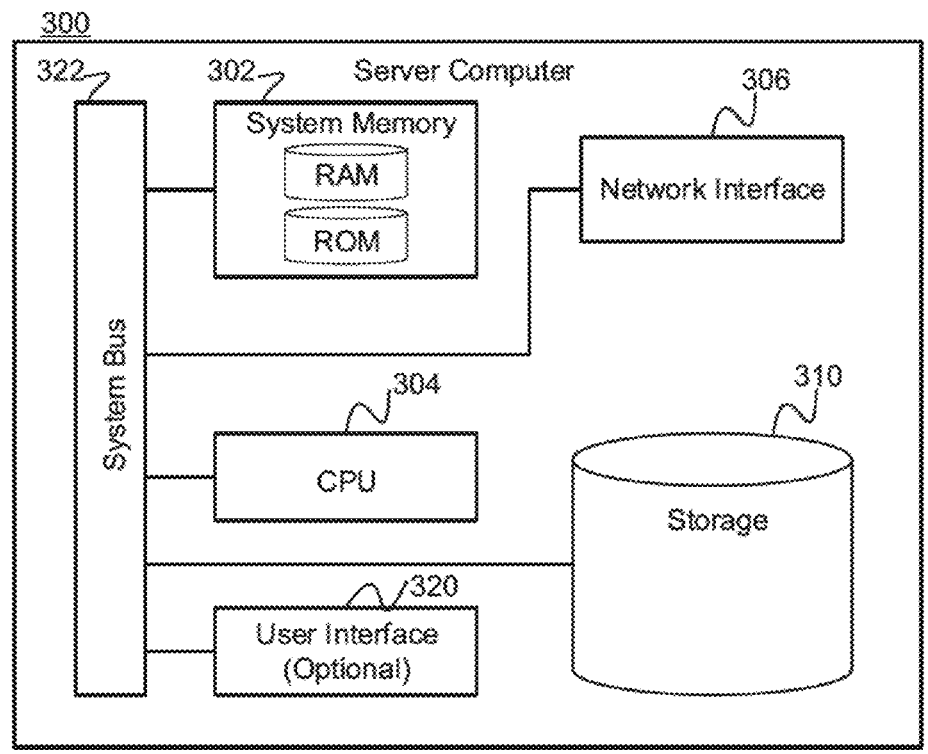
FIGS. 3A through 3D illustrate exemplary block diagrams of a server computer.
Figure 3B:
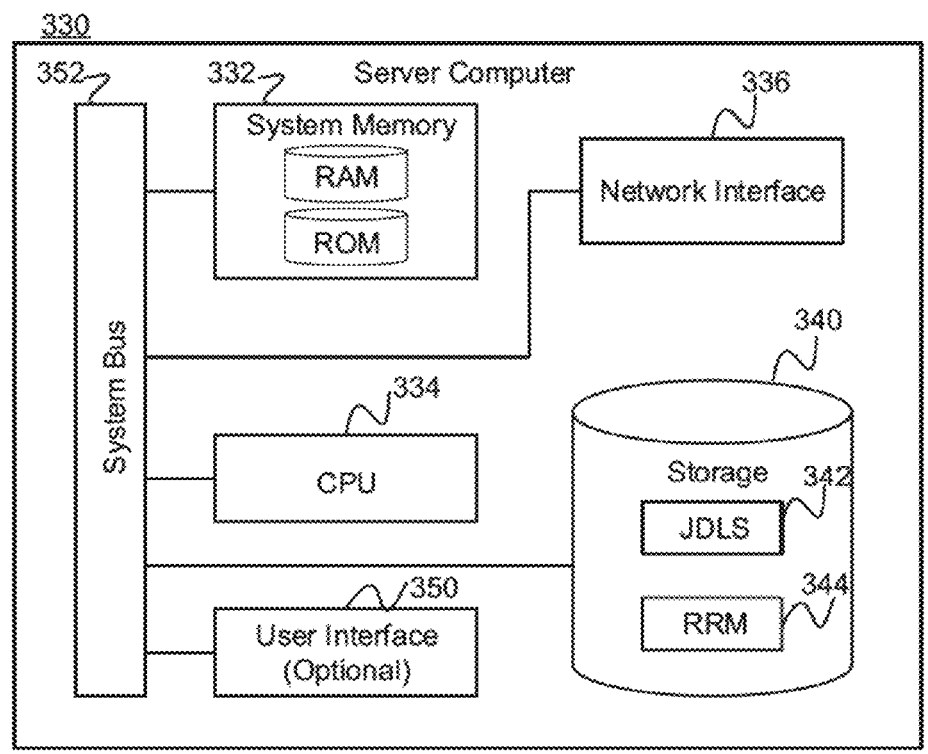

FIGS. 3A and 3B illustrate block diagrams of server computers 300 and 330 according to an embodiment. The server computers 300 and 330 may be representative of any of the network controller devices 110a-c and other servers described herein. The network controller device may be implemented as a dedicated server or as part of a base station according to implementation. The server computers 300 and 330 include one or more processor devices including a central processing unit (CPU) 304 or 334. The CPU 304 or 334 may each include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution. The CPU 304 or 334 is responsible for executing computer programs stored on volatile (RAM) and nonvolatile (ROM) memories 302 or 332 and a storage device 310 or 340 (e.g., HDD or SDD).

In an embodiment, the server computer 300 or 330 representing a network controller device 110a, 110b, 110c may be a SON controller, a RRM, or a server for detecting, locating and/or executing suitable countermeasures against jamming signals that is hereinafter referred to as a Jammer Detection and Location Server, or "JDLS". JDLS and its operations are explained below in more detailed in connection with FIGS. 7-11. In an embodiment, the server computer 330 is provided with a JDLS functionality 342 and/or an RRM functionality 344 stored in the storage device 340 as illustrated in FIG. 3B.

The server computer 300 or 330 may also include an optional user interface 320 or 350 that allows a server administrator to interact with the server computer's software and hardware resources and to display the performance and operation of the networked computing system 100. In addition, the server computer 300 or 330 may include a network interface 306 or 336 for communicating with other network elements in a networked computer system, and a system bus 322 or 352 that facilitates data communications amongst the hardware resources of the server computer 300 or 330.

In addition to the network controller devices 110a-c, the server computer 300 or 330 may be used to implement other types of server devices, such as an antenna controller, an RF planning engine, a core network element, a database system, or the like. Based on the functionality provided by a server computer, the storage device of such a server computer serves as a repository for software and database thereto. For example, if the network controller device 110 is implemented, the storage device 310 or 340 may include a phase adjustment map having a listing of adjacent wireless base stations and their instantaneous transmission phase adjustments, a scheduling unit for generating a Carrier Phase Estimation (CPE) phase management table for transmitting data to mobile stations associated with the server computer or base station, a beamforming unit for generating the beamformed signals for transmission to a particular mobile station, and a priority fixing unit for determining a priority level for interference associated with an adjacent interfering base station.

Figure 3C:
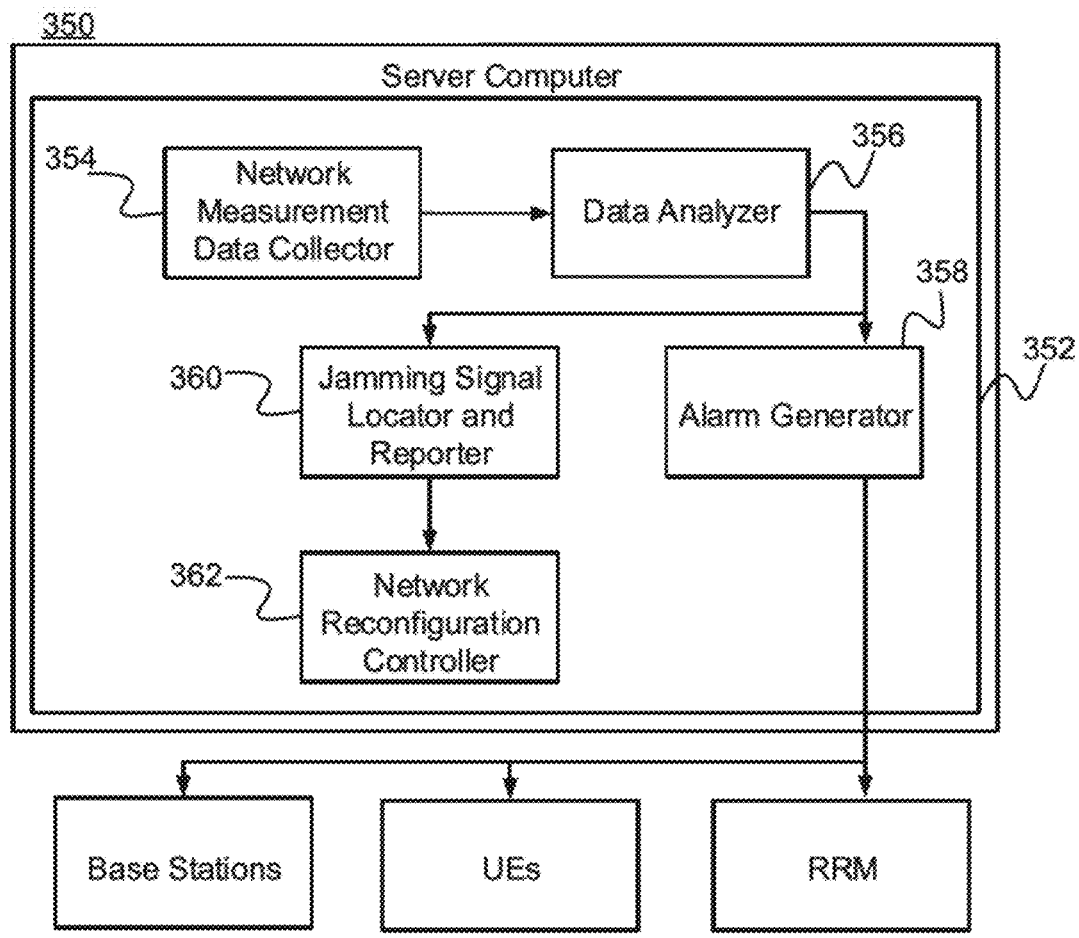
Figure 3D:
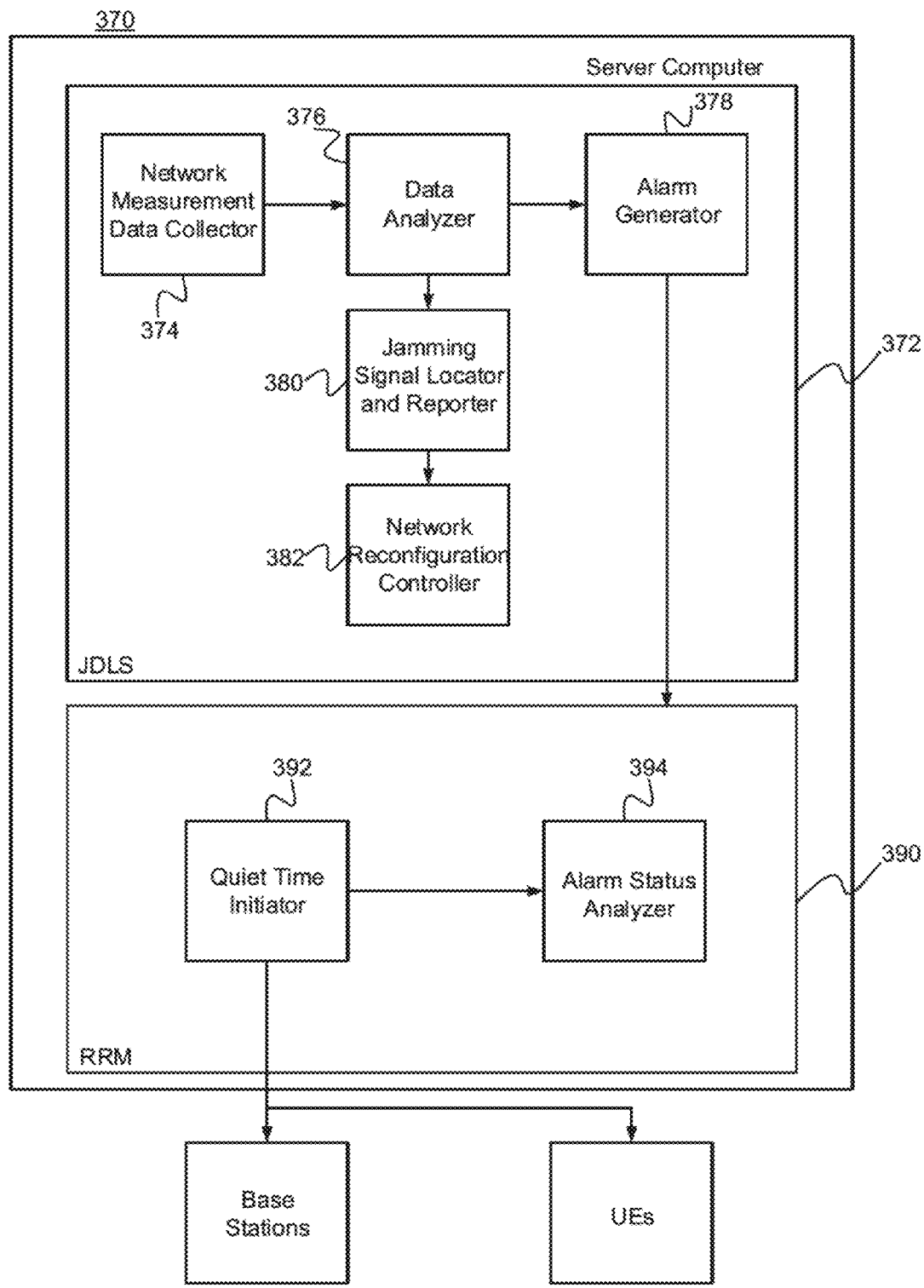

FIGS. 3C and 3D illustrate block diagrams of server computers 350 and 370 according to an embodiment. The server computers 350 and 370 may be representative of any of the network controller devices 110a-c and other servers described herein. The network controller device may be implemented as a dedicated server or as part of a base station according to implementation. In an implementation, the server computers 350 and 370 include a JDLS 352 or 372 implemented as a software module.

In an embodiment, JDLS 352 or 372 include a network measurement data collector 354 or 374, a data analyzer 356 or 376, an alarm generator 358 or 378, a jamming signal locator and reporter 360 or 380, and a network reconfiguration controller 362 or 382. In an embodiment, the alarm generated by alarm generator 358 in server computer 350 is transmitted to base stations, user equipment and an RRM, while the alarm generated by alarm generator 378 is provided to RRM 390.

In an implementation, a JDLS is included in a server computer that performs other functions such as network resource management (or radio resource management). In an embodiment, server computer 370 also includes an RRM 390 implemented as a software module that includes a quiet time initiator 392 and an alarm status analyzer 394. In an implementation, instructions generated by the quiet time initiator are transmitted to base stations and user equipment.

Figure 4:
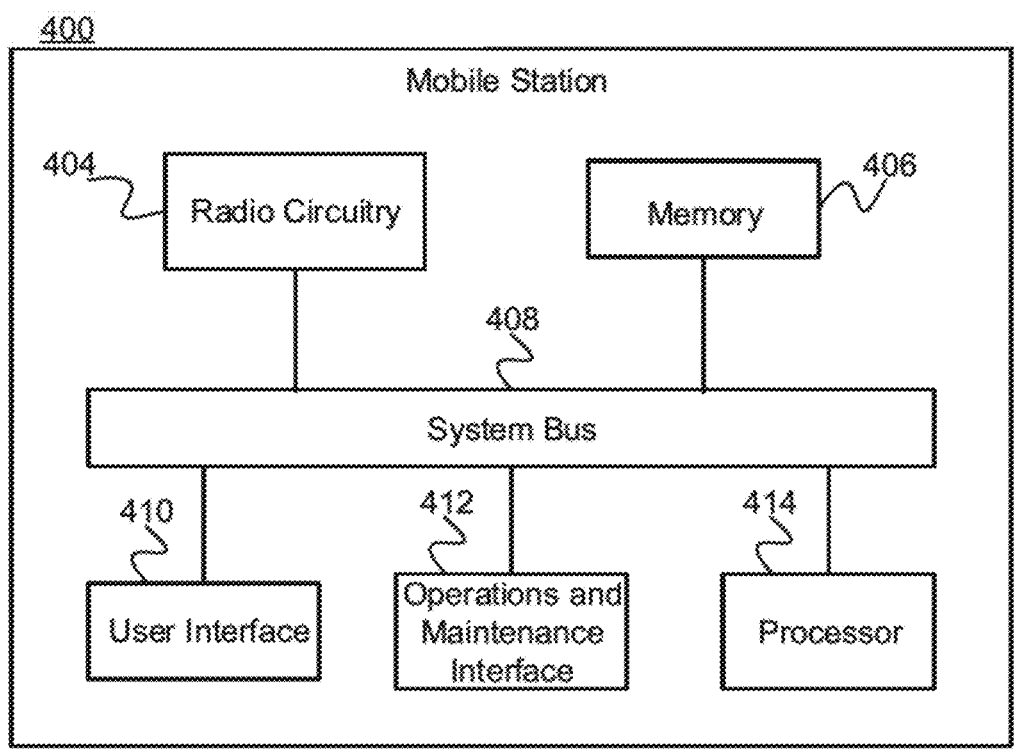
FIG. 4 illustrates an exemplary block diagram of a mobile station.

FIG. 4 illustrates a block diagram of a mobile station 400 according to an embodiment. The mobile station may be representative of any of UEs 108 shown in FIG. 1. The mobile station 400 may include components similar to those described above in connection with the base station 200. The mobile station 400 may include radio circuitry 404 corresponding to the radio circuitry 201 in FIG. 2, a memory 406 corresponding to the memory 226, a system bus 408 corresponding to system bus 220, a user interface 410 corresponding to user interface 222, an operations and maintenance interface 412 corresponding to the operations and maintenance interface 224, and a processor (or CPU) 414.

Wireless networks may be vulnerable to deliberate jamming signals designed to attack specific frequency and time resources for a portion of the frequency bandwidth, such as control channels and random access channels in an uplink radio frame. As used herein, the term "jamming signal" refers to radio noise (or "white noise") or specific signals that are transmitted deliberately in attempt to disrupt radio communications between wireless network elements such as base stations and mobile stations. Although jamming signals can exist in any frequency and time resource in an LTE radio frame, signals that jam control channels or random access channels in an uplink (or downlink) may be an effective means of disruption and result in user equipment experiencing a Denial of Service in a wide area around the jamming signal.

In LTE uplink transmissions, physical channels may include the Physical Uplink Control Channel (PUCCH); the Physical Uplink Shared Channel (PUSCH); and the Physical Random Access Channel (PRACH). PUCCH signals are used to send a variety of uplink control information, including among other information Scheduling Requests (SRs), Hybrid Automatic Repeat request (HARQ) acknowledgements (ACKs), and channel quality indicators (CQI) reports. PUCCH resources may be found at the edges of the system bandwidth, thereby making PUCCH signals targets for jamming signal attacks. Deliberate jamming of PUCCH signals could prevent HARQ ACKs, CQI reports and SRs from reaching base stations, which could in turn result in retransmission, poor link adaptation, and degradation of services.

PUSCH signals are often used for data transmissions and can be found in the center of the uplink bandwidth. Although PUSCH signals can be used for uplink control signaling when a user equipment needs to send data, use of PUSCH in lieu of PUCCH in the presence of a jamming signal will also result in an increase in the reception failures in PUSCH resources.

PRACH signals are used for random access functions and can be assigned resources within the PUSCH signal regions. PRACH signals can be used for, among other purposes, initial access when establishing a radio link; handover when uplink synchronization needs to be established to the target cell; maintaining uplink synchronization for a UE, positioning using methods based on uplink measurements, and for scheduling requests if no dedicated scheduling request resources have been configured on PUCCH resources. When PRACH resources are attacked by deliberate jamming signals, random access performance is degraded and user equipment will experience increased random access failures.

Figure 5:
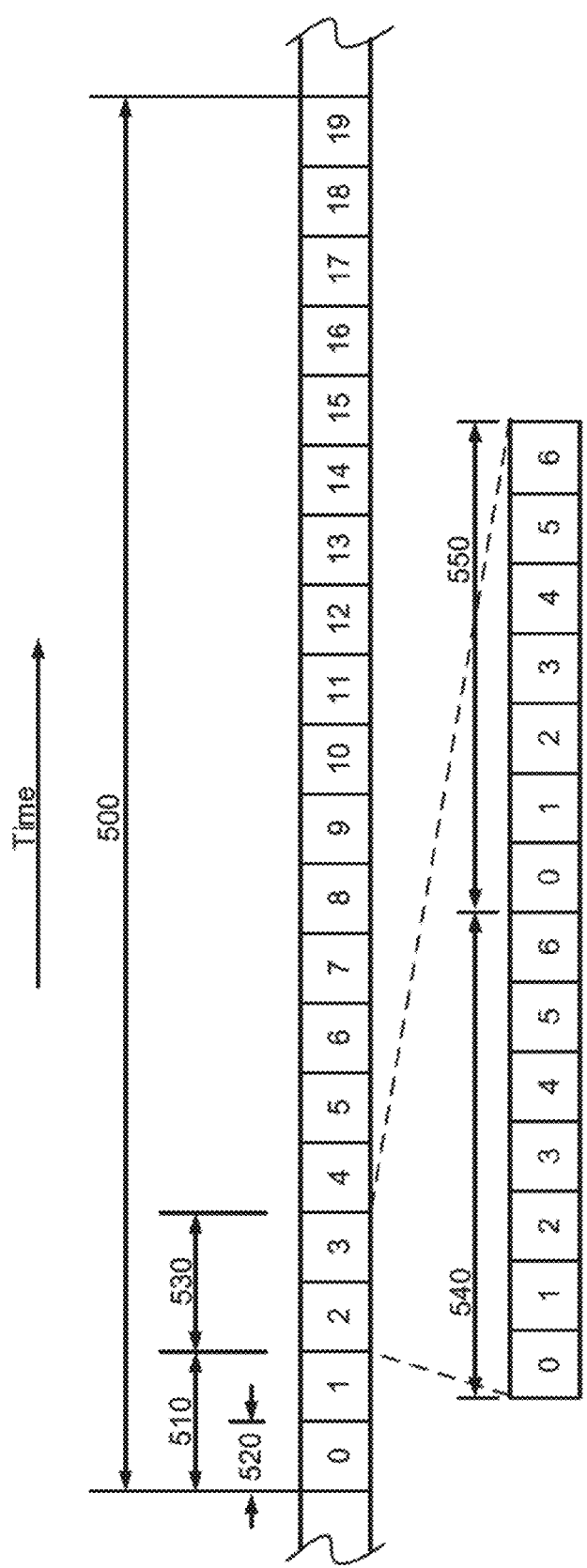
FIG. 5 illustrates the structure of an uplink radio frame broadcast by a base station in an embodiment.

FIG. 5 illustrates the structure of an uplink radio frame broadcast by a base station according to an embodiment. The structure in FIG. 5 is similar to that used for LTE uplink transmissions. A frame 500 is 10 milliseconds long and may be divided into ten subframes 510 in an implementation. Each subframe 510 may be further divided into slots 520. Thus, frame 500 may have ten subframes 510 and twenty slots 520 (numbered from 0 to 19), and every pair of slots starting with slots 0 and 1 is equivalent to one subframe. As an example, slot 530 forms the second subframe, which includes slots 2 and 3. Further, each slot such as 540 and 550 includes seven Orthogonal Frequency-Division Multiplexing (OFDM) symbols (labeled 0 to 6), which are serial in the time domain. As would be understood by those skilled in the art, the vertical dimension of a symbol represents a frequency spectrum.

Figure 6:
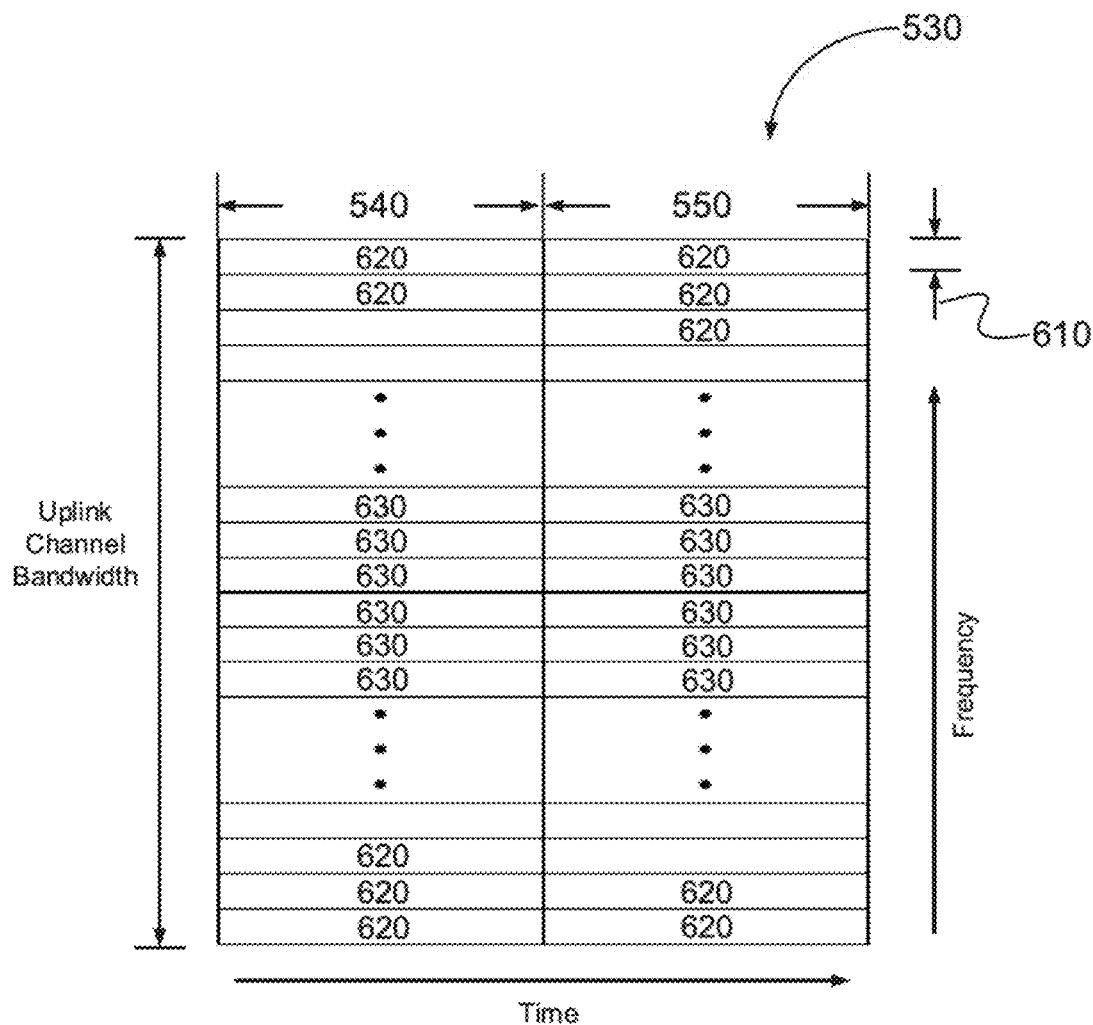
FIG. 6 illustrates a frequency and time resources allocation for control and random access channels in an embodiment.

FIG. 6 illustrates a frequency and time resources allocation for a system uplink channel bandwidth for slots 540 and 550 corresponding to slots 2 and 3 of subframe 530 according to an embodiment. The system bandwidth composed of resource blocks 610, each of which includes 72 contiguous subcarriers in one or multiple uplink subframes. PUCCH resources are found at the edges of the system bandwidth in resource blocks 620 in an implementation. In an implementation, PRACH signals are mapped to six contiguous resource blocks 630 spanning slots 540 and 550 that are in located within the system uplink channel bandwidth. PRACH locations in system uplink channel bandwidths may vary in neighboring base stations to improve PRACH preamble detection.

Uplink transmissions may be subject to interference that can be avoided with network reconfiguration. When measured network data indicates the presence of an interference signal, further investigation of the interference signal may be desired to determine whether the interference signal results from intentional jamming signal or if the interference signal emanates from other types of interference sources that are incidental and not deliberate.

With respect to PUCCH channels, deliberate disruption may result from a noise waveform spanning the resource blocks at the edges of the system uplink bandwidth, or from interference signals that attack specific PUCCH time and frequency resources. More frequent retransmissions, degradation of service, reduction in the availability of radio resources, and decreases in cell throughput are non-limiting examples of service problems that may be reflected in network measurement data for Key Performance Indicators (KPIs) indicating the presence of a jamming signal that requires further analysis.

With respect to PRACH channels, deliberate disruption may also result from a noise waveform spanning the resource blocks assigned to PRACH. A deliberate jamming noise signal may have a relatively high power spectral density, or jammer-to-signal ratio, in the frequencies utilized by PRACH. Deliberate interference signals may also attack specific PRACH time and frequency resources. PRACH resources may also be intentionally attacked with a jamming signal containing bogus PRACH signals. If a jamming signal includes a bogus RACH signal within the PRACH resources, the random access procedure after the preamble detection may fail because the receiving base station will not receive an acknowledgement in response to a random access response message. The detection and handling of jamming signals will now be explained in more detail below in connection with FIG. 7 through FIG. 11.

Figure 7:
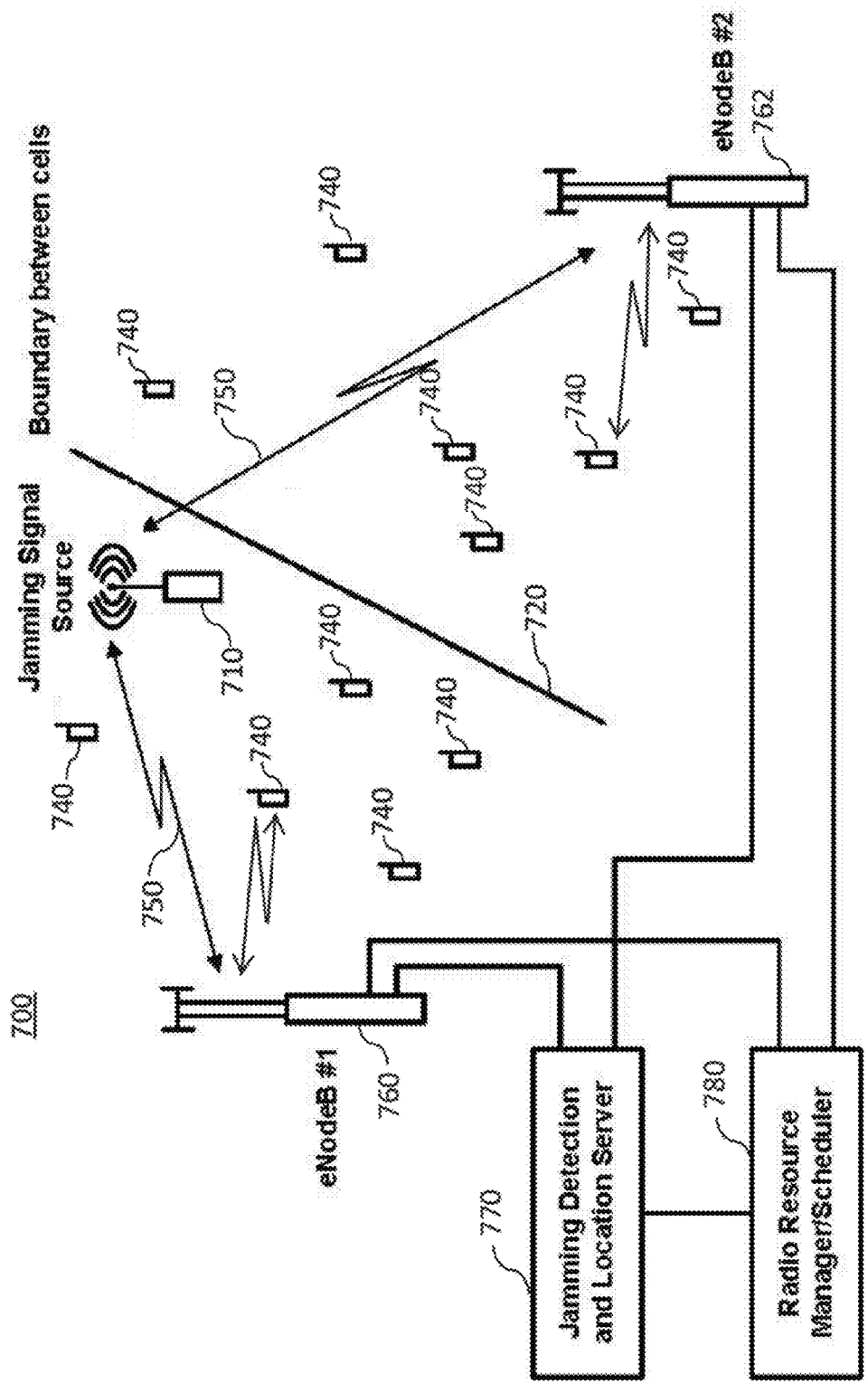
FIG. 7 illustrates a system diagram of a configuration of an LTE network in an embodiment.

FIG. 7 illustrates a system diagram of a configuration of an LTE network 700 in an embodiment. In an implementation, a jamming source 710 sends jamming signals that cross a boundary 720 between two neighboring cells, while base stations (or eNodeBs) 760 and 762 provide services to UEs 740. Jamming signals 750 are measured by base stations (or eNodeBs) 760 and 762. In an embodiment, JDLS 770 monitors jamming signal measurement reports from base stations (or eNodeBs) 760 and 762. In an implementation, JDLS 770 generates jamming alerts when the measurement reports indicate a potential jamming signal. JDLS 770 may also localize, or determine the location of, the source of the potential jamming signal. In an embodiment, JDLS 770 is implemented as a dedicated server. JDLS 770, however, may be implemented as part of a network controller device (e.g., numeral 110 in FIG. 1, numeral 342 in FIG. 3B, or numeral 352 in FIG. 3C), or part of a base station, e.g., as software module stored in the storage device.

In an embodiment when a jamming alert is raised, an RRM 780 (or a network controller device) informs data schedulers. The data schedulers schedule the use of radio resources according to instructions received from RRM 780. RRM 780 also may instruct the data schedulers to periodically schedule network quiet times for certain radio time and frequency resources on the uplink so that the potential jamming signal can be characterized and confirmed during these periods. According to implementation, RRM 780 may be employed as a dedicated server, or part of a network controller device (e.g., numeral 110 in figure, numeral 344 in FIG. 3B, or numeral 390 in FIG. 3D), or part of a base station.

Figure 8:
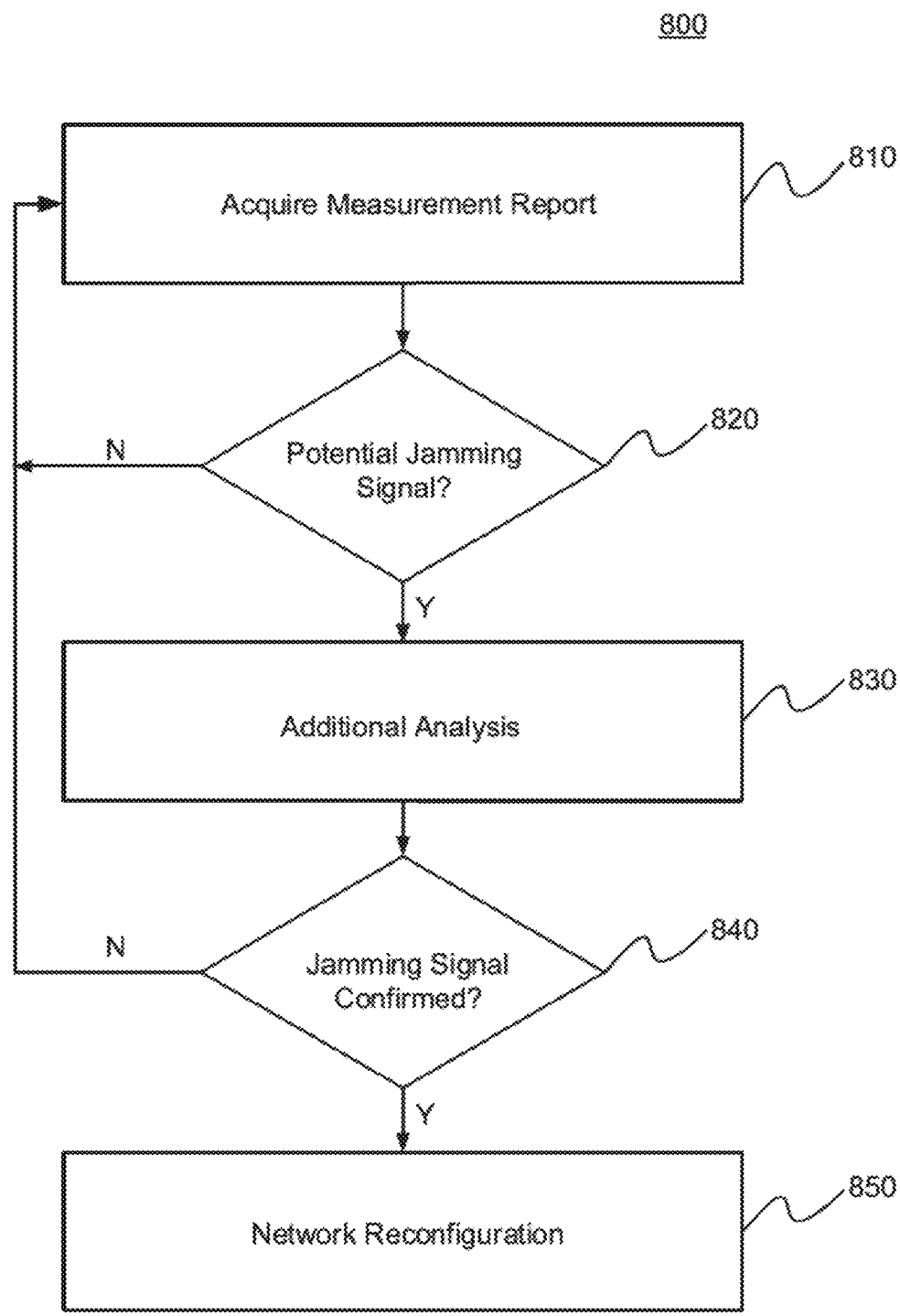
FIG. 8 illustrates a process for jamming signal detection and avoidance according to an embodiment.

FIG. 8 illustrates a process 800 for jamming signal detection and avoidance according to an embodiment. At 810, measurement reports (e.g., network measurement data) for jamming signal detection are acquired from wireless network elements such as base stations. At 820, an alert is issued by the JDLS when data in the measurement reports indicates the presence of a potential jamming signal. In an embodiment, the data in the measurement reports that are used for detecting a potential jamming signal include one or more of the following: (1) key performance indicators, (2) data collected during quiet time measurements when base stations 760 and 762 schedule no uplink transmissions on particular frequencies, and (3) bogus PRACH signal reports.

At 830, an additional analysis is made in order to confirm the presence of a jamming signal source, e.g., by obtaining additional measurement reports by base stations. The rate of KPI and/or measurements may be increased. In an embodiment, the additional analysis is performed by the JDLS, the RRM, or both in cooperation with each other. At 840, a determination is made whether or not a jamming signal is present based on the measurement reports gathered at 810 and 830. If the presence of a jamming signal is confirmed, then the wireless network is reconfigured to avoid and prevent disruption from the jamming signal. In an embodiment, the reconfiguration of the wireless network is performed by the JDLS or the RRM. Otherwise, the process 800 returns to step 810 continue monitoring the wireless network for a potential jamming signal.

Figure 9A:
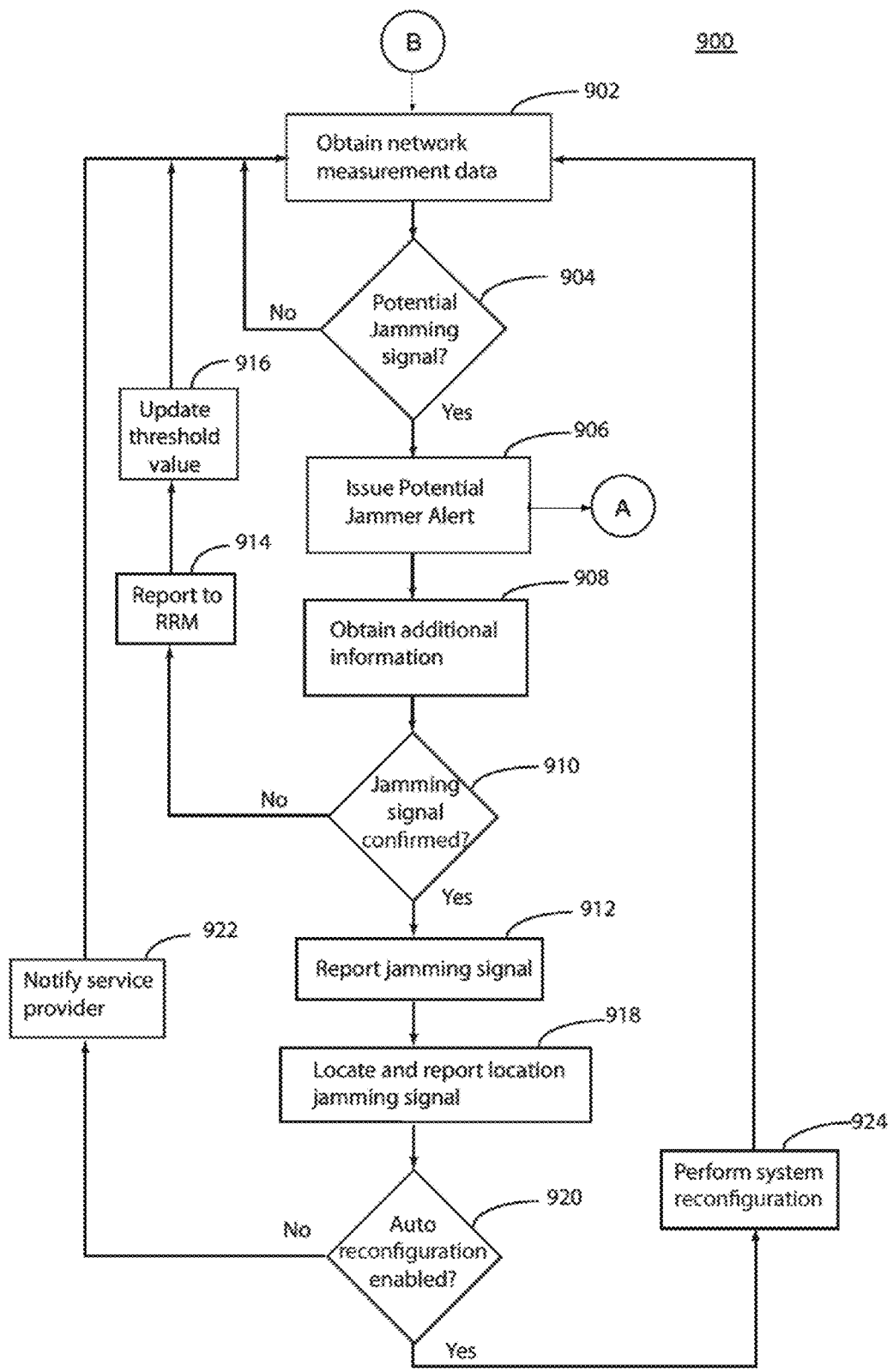
FIG. 9A illustrates a process for handling a jamming signal according to an embodiment.

FIG. 9A illustrates a process 900 for handling a jamming signal according to an embodiment. A potential jamming signal can be detected using a number of different methods. At 902, network measurement data are obtained for detecting the presence of a potential jamming signal. The network measurement data are collected continuously from wireless network elements and analyzed for an indication of a potential jamming signal. The collected network measurement data include: (1) key performance indicator (KPI) data; (2) base station measurement reports with data collected during quiet time measurements when base stations schedule no uplink transmissions on particular frequencies; and (3) base station reports on bogus PRACH signals. The collection of the network measurement data is described in more detail below in connection with FIGS. 10 and 11. As will be understood by those skilled in the art, other types of data may be collected for detecting a potential jamming signal according to implementation.

At 904, the network measurement data are analyzed to determine whether or not there is any indication of a potential jamming signal. In an embodiment, the analysis involves comparing each type of the network measurement data with a corresponding threshold value that has been previously defined.

For example, in an implementation where Key Performance Indicator (KPI) data are used, current KPI data obtained at step 902 are compared to corresponding threshold values that have been defined based on historical KPI values. The threshold values define expected ranges for the current KPI under normal operating conditions. If any of the current KPIs is found to be outside of an expected range as defined by the corresponding threshold value, a potential jamming signal is deemed to be present in the network. The threshold values may be an incremental or decremental values. KPIs include, without limitation, cell throughput, PRACH detection failure rates, PRACH random access failure rates, and PUCCH utilization.

In an embodiment, a sudden decrease in cell throughput from one time period to another may be an indication of the presence of a potential jamming signal. The rates of decrease are compared with corresponding threshold values that have been predefined based on historical statistics. An indication of a potential jamming signal is detected if the rate of sudden decrease is greater in magnitude than the threshold value relating to cell throughput.

Similarly, a sudden increase in the PRACH detection failure rate or PRACH random access failure rate, or a sudden increase in PUSCH reception failures, may also be analyzed with respect to the corresponding historical statistics or threshold values in order to detect an indication of a potential jamming signal.

In an embodiment, KPI data are collected by base stations and UEs and provided to a server such as a JDLS for statistical analysis. The compiled historical KPI data and historical statistics on KPIs are stored in the JDLS. These historical KPI statistics are used to define threshold values for each type of KPI.

For example, the highest incremental/decremental rate for a KPI that has been determined to be non-jamming related event during a particular time period (e.g., the past year or the past three months, or the past one month) may be used as the threshold value for that KPI. The threshold values may also be adjusted according to a particular time period or a particular event occurring at a geographic region, e.g., a region near a football stadium during a football game is expected to have unusually low cell throughput.

In an embodiment, the threshold values may be based on a multiple of standard deviations of KPI. The threshold values may also provide an acceptable range of values for a KPI according to implementation.

In an embodiment, the cell throughput rates may meet or exceed threshold values when a jamming signal is present in PUCCH time and frequency resources, preventing HARQ ACKs from reaching the base station and resulting in retransmissions and degradation of service. In addition, cell throughput rates may also meet or exceed threshold values when a jamming signal present in PUCCH resources prevents a base station from receiving CQI reports, which may result in poor link adaptation and further degradation of service.

In an embodiment, high power noise jamming signals in the PRACH resources may prevent the base station from detecting a genuine PRACH signal, resulting in an increase in the PRACH detection failure rate in addition to an increase in PRACH random access failures. Similarly, in another embodiment, when a bogus PRACH signal is received, PRACH random access failures will increase when no response to the message sent by the base station in response to the bogus PRACH is received.

In an embodiment, PUSCH reception failure rates may increase when available PUCCH resources are reduced as a result of a PUCCH jamming signal.

In an embodiment, the KPIs may be collected for base stations in the wireless network, where each set of KPIs may be associated with a particular base station or with a geographic area. The geographic area may correspond to a coverage area of a single base station or include at least a portion of coverage areas of a plurality of base stations.

Although the network measurement data that are analyzed at step 904 has been described above in terms of KPIs, other types of network measurement data may be used as described below in connection with FIGS. 10 to 12.

Returning to 904, if the network measurement data do not meet any threshold value, the process 900 returns to 902 and continues acquiring the network measurement data from wireless network elements.

At 906, a potential jammer alert is issued based on comparison of the network measurement data with the threshold values, e.g., the network measurement data meets any of the threshold values. In an embodiment, the alert is issued by a JDLS, such as by JDLS 770 in FIG. 7 as a non-limiting example. Further investigation of the causes of the potential jammer alert may be conducted to determine if the potential jamming signal is a result of intentional jamming or other types of interference sources. The alert may be reported to the service provider. Optionally, the alert may be reported to operators so that operators are aware of the existence of a potential jamming signal or other strong interference source in the network.

At 908, a JDLS or RRM instructs the base stations to obtain additional network measurement data to characterize and identify the potential jamming signal and its source. The JDLS or RRM may instruct the base stations to schedule further quiet times to allow measurements to be made to better characterize the potential jamming signals in frequency and time domains.

In an embodiment, at 908 the further quiet times are scheduled during PUCCH times and frequencies when the potential jammer alert is triggered by network measurement data related to KPIs or the measurement of PUCCH or PRACH interference levels by base stations. Measurements may be taken on all resource blocks in addition to the PUCCH resource blocks during the quiet times. In an example, an unidentified interference source with continuity or periodicity in time detected during the quiet times may confirm the presence of a jamming signal.

In an embodiment, at 908 the further quiet times are scheduled during PRACH times and frequencies when the potential jammer alert is triggered by network measurement data related to PRACH detection failures. If PRACH frequency offsets are different in neighboring base stations, the JDLS may instruct a base station to take measurements on the PRACH resources while instructing neighboring base stations not to transmit on those resources. In an embodiment, quiet times may span the entire system bandwidth to measure the energy level of each resource block. If the energy level of certain resource blocks is over a threshold level when the entire system bandwidth is in quiet time, then the presence of a jamming signal may be confirmed.

In an embodiment, at 908 when the potential jammer alert is triggered by PRACH random access failures, the JDLS may instruct the base station to send another random access response to confirm that the presence of a bogus preamble. The presence of a bogus preamble may confirm the presence of a jamming signal.

At 910, a determination is made whether or not the potential jamming signal is in fact a jamming signal. If the potential jamming signal is determined not to be a jamming signal, the time and frequency resource information affected by the potential jamming signal is reported at 914 to the RRM. At 916, the threshold value that triggered the potential jamming signal alert may be updated with a new value. The update may be done automatically or manually with the assistance of an administrator. Optionally, the time and frequency resources affected by the potential jamming signal may not be allocated for uplink transmissions by the RRM until the potential jamming alert is removed.

Figure 9B:
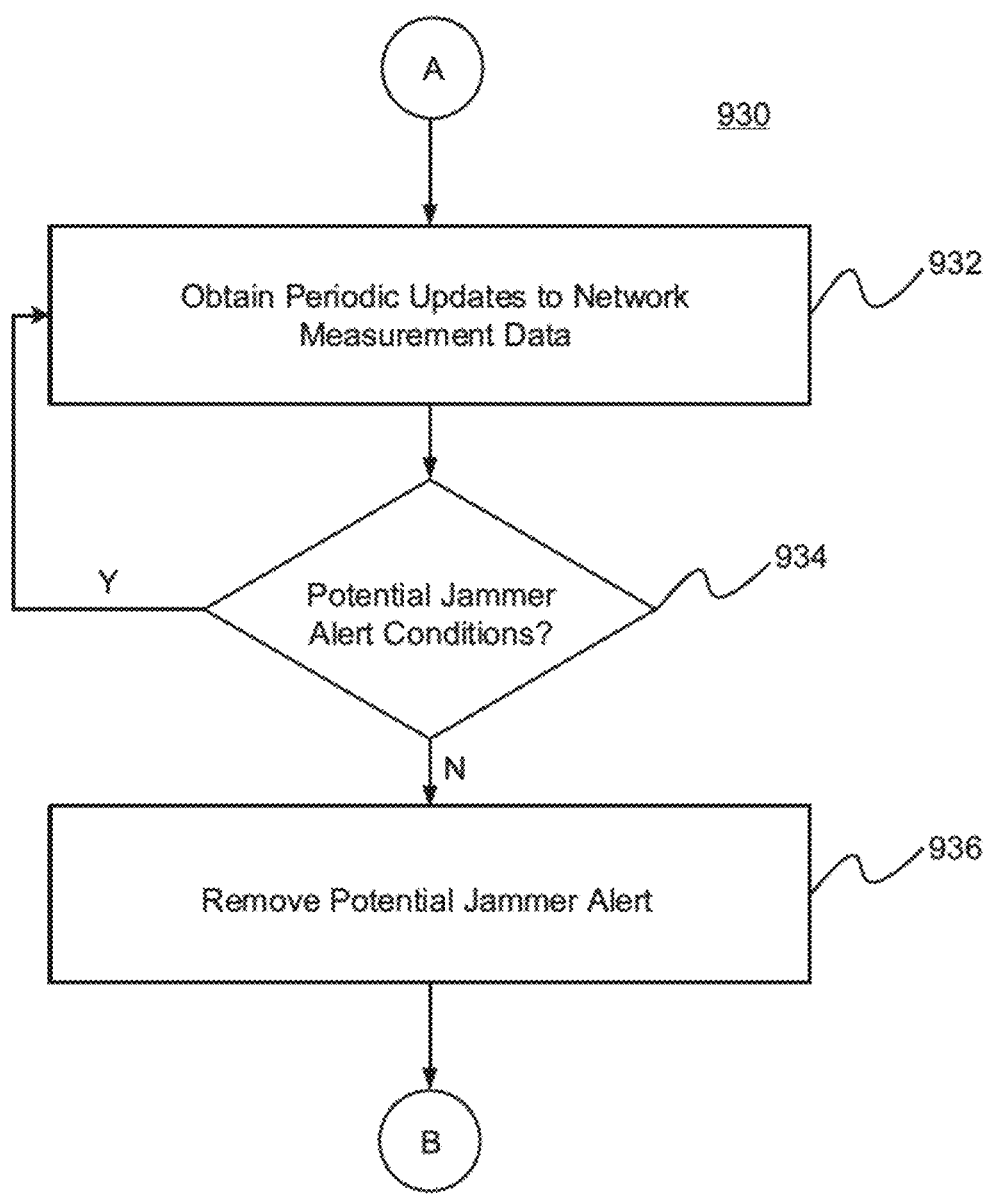
FIG. 9B illustrates a process for removing a potential jamming signal alert according to an embodiment.

FIG. 9B illustrates a process 930 for removing a potential jamming signal alert according to an embodiment. The network measurement data can be periodically monitored and the potential jammer alert can be removed when all the alert conditions return to normal. At 932, periodic updates to the network measurement data are obtained. At 934, the updated network measurement data are analyzed to determine if conditions that raised the potential jammer alert are still in place. In an embodiment, if the updated network measurement values remain outside of an expected range defined by corresponding threshold values, then the process returns to periodic monitoring of network measurement data at 932. If the updated network measurement data are within threshold values, the potential jammer alert is removed at 936. The period for monitoring network measurement data may be configurable by administrator, and the period may be optionally updated after each update. Once the potential jammer alert is removed, the system may return to obtaining network measurement data, e.g., 902 in FIG. 9.

Returning to 910, if the potential jamming signal is determined be a jamming signal, the presence of a deliberate jamming signal is reported to the service provider at 912. Optionally, at 918 the source of the jamming signal may be located and reported to the service provider. The geographical location of the potential jammer may be found using triangulation or trilateration methods based on the data collected at 902 and at 908, and the geographical information provided by base stations. In an embodiment, when the potential jammer alert is triggered by PRACH random access failures, the base station may use the specific bogus random access preamble in finding the geographical location of the potential jammer Methods of locating the source of an interference signal are found in U.S. Pat. No. 8,229,368, which is incorporated herein by reference.

Optionally, at 910 and 918, signal fingerprints may be used to determine if the potential jamming signal is a known and previously characterized co-channel interference rather than intentional and unknown external interference. The amplitude and phase component of signals may be used as fingerprints. The frequency and time domain characteristics of signals can also be used as fingerprints. If the signal fingerprint reflects known interference and if the geographical location of the potential jamming signal matches the location of other network elements, then the potential jamming signal can be identified as co-channel interference.

At 920, it is determined whether or not the network can perform automatic reconfiguration and thereby prevent the jamming signal from disrupting the network. At 922, if the automatic reconfiguration is not enabled, the service provider is notified so that the network may be manually reconfigured. In some embodiments, the notification includes a recommendation on possible configuration changes that should be made, e.g., based on information gathered on the jamming signal.

At 924, if the automatic reconfiguration is enabled, RRM performs the network system reconfiguration, e.g., by frequency reassignment or splitting. If a frequency assignment is available, the synchronization signal frequency assignments may be changed to avoid the frequencies affected by the jamming signal. For example, referring to FIG. 9C, if PUCCH signals 942 and PRACH signal 944 in system bandwidth 940 experiences jamming signals 946, a new frequency bandwidth 950 having PUCCH signals 948 and PRACH signal 952 are reassigned thereto in order to avoid disruptive effects of the jamming signal 946. Alternatively, the signal 940 may be reassigned to a new frequency bandwidth 958 having PUCCH signals 954 and PRACH signal 956.

On the other hand, referring to FIG. 9D, if a frequency assignment is not available, then the operating bandwidth frequency may be split into two operating system bandwidths. For example, the signal 940 may be split into two smaller frequency bandwidths 960 and 970 (not drawn to scale) having PUCCH signals 962 and 966 and PRACH signal 964 and 968, respectively, thereby avoiding frequencies used by jamming signal 946.

After reconfiguring the network, the process 900 returns to step 902 and continues monitoring the wireless network for potential jamming signals. The potential jammer alert is optionally removed or canceled.

Figure 10:
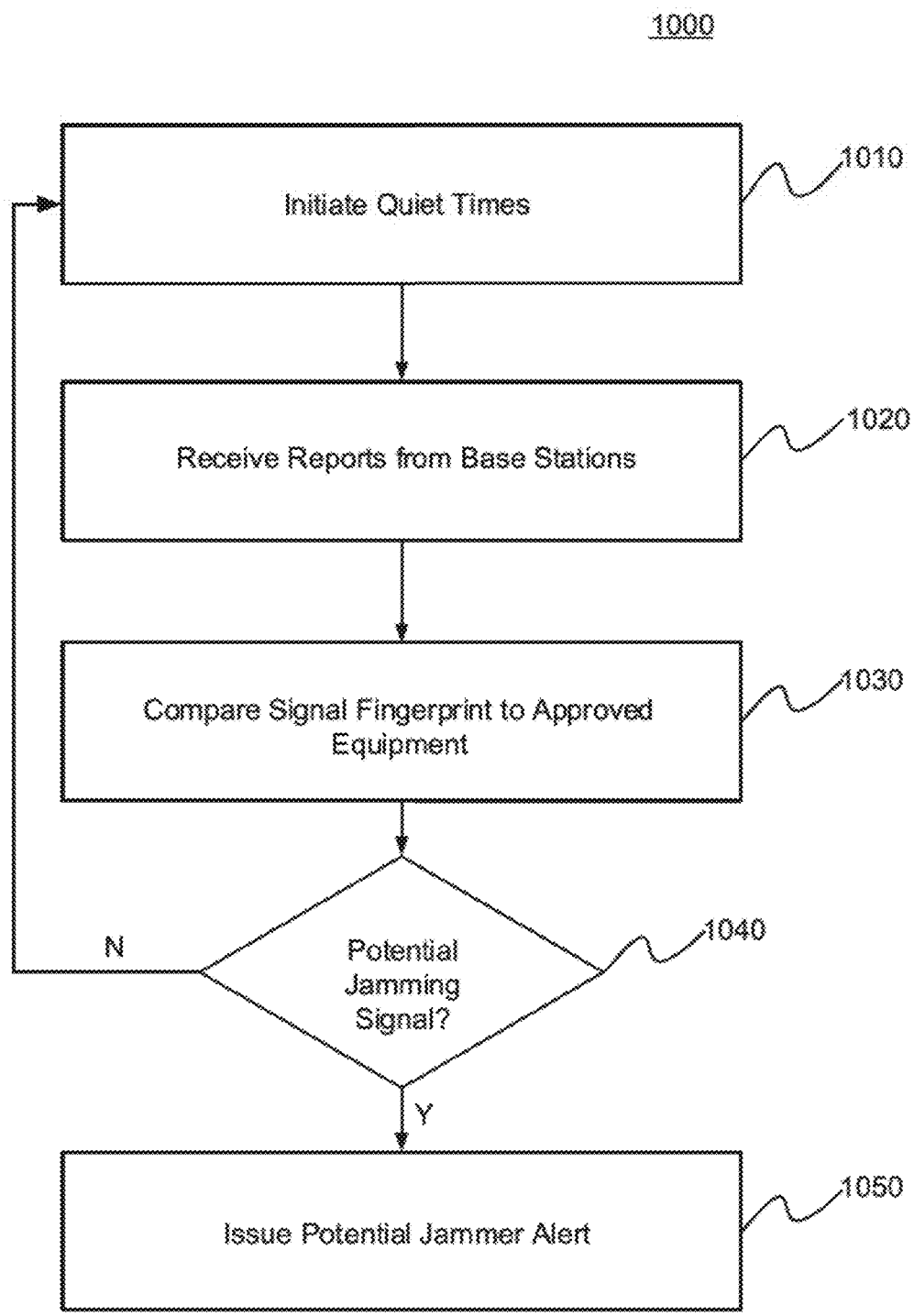
FIG. 10 illustrates a process for analyzing network measurement according to an embodiment.

FIG. 10 illustrates a process 1000 for analyzing network measurement according to an embodiment. The network measurement data analyzed involves data acquired during a period when base stations do not schedule uplink transmissions over certain frequencies.

At 1010, a JDLS or a RRM server instructs base stations within a particular network region not to schedule uplink transmissions on select frequencies during frequency-based quiet times. For example, a RRM server can instruct the data scheduler component to periodically schedule frequency-based quiet times on an uplink during which base stations within a particular network region are instructed not to schedule any uplink signals including control signals and random access signals over a particular set or range of proprietary network frequencies. In another example, base stations may be instructed not to schedule PUCCH, PRACH, or other control signals from UEs that would typically be transmitted on a periodic basis. If there is any jamming signal source in the region, the source may continue to transmit jamming signals while the UEs associated with the base stations in the region are quiet. Base stations in the vicinity of a jamming signal may detect and collect information on the jamming signal.

At 1020, the JDLS receives a report from the base stations on the signal activities during the quiet times imposed by the JDLS. The report includes the signal characteristics of signals being transmitted during the quiet times. At 1030, the signal characteristics are analyzed to determine if the signal activities during the quiet times are from interference signals or jamming signals. JDLS compares the fingerprint of the signal with that of known and approved equipment in its database. If the fingerprint does not match that any of the known and approved equipment with previously characterized interference signals, then the presence of a deliberate jamming signal may be indicated and a potential jamming alert is issued (1040 and 1050). Alternatively, a potential jammer alert may also be issued if the fingerprint matches that of equipment in a blacklist.

Figure 11:
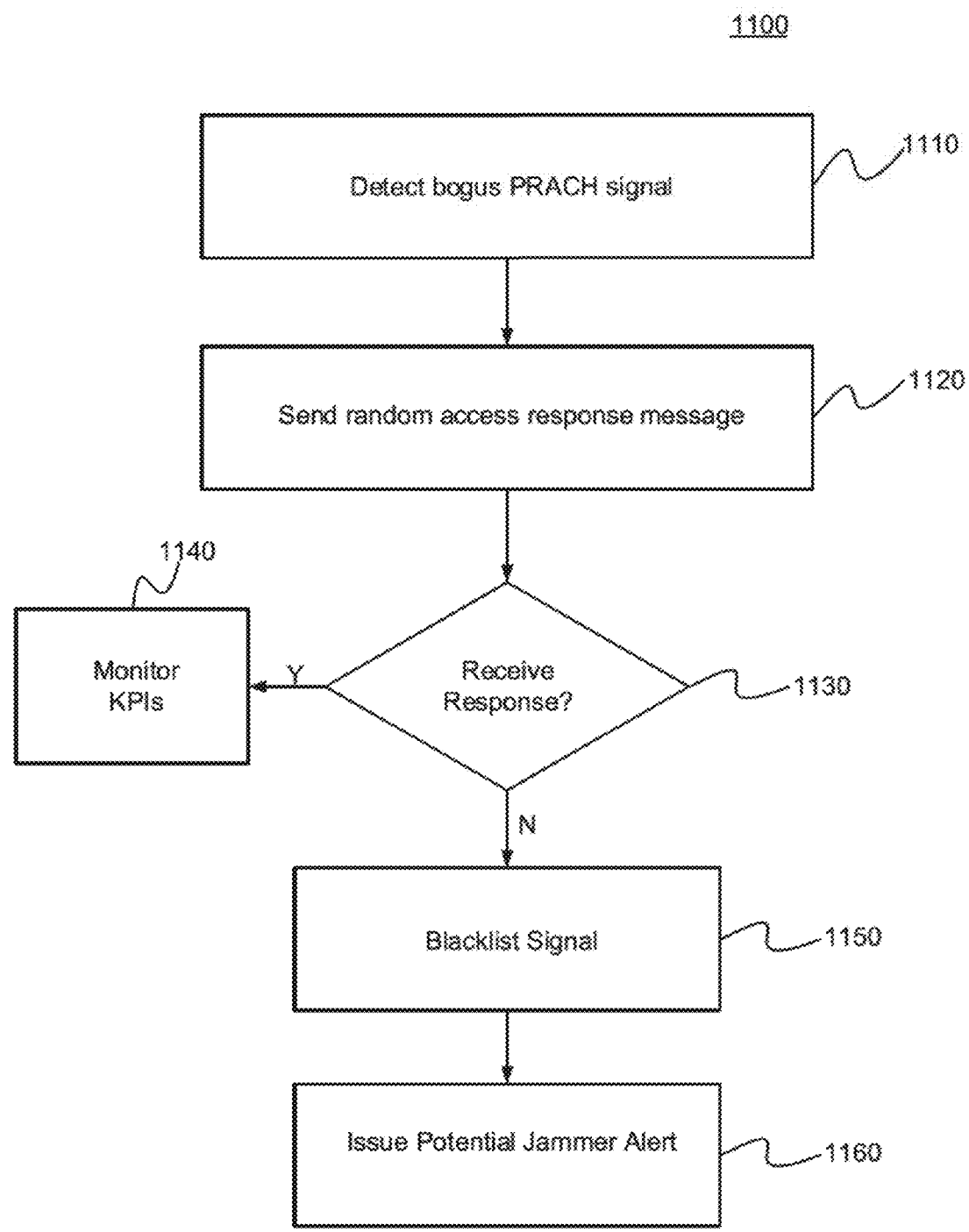
FIG. 11 illustrates a process for analyzing network measurement data according to an embodiment.

FIG. 11 illustrates a process 1100 for handling a bogus PRACH signal in an embodiment. In some embodiments, after receiving a bogus PRACH signal in 1110, base stations send a random access response message with the preamble identification, a timing adjustment, and a temporary identity (TC-RNTI), and a scheduling grant at 1120. If the detected preamble is a bogus preamble, then the base station does not receive a response to its random access response message at 1130. In this event, the base station may record the preamble ID and the timing adjustment on a blacklist in 1150 and issue a potential jammer alert at 1160. If the base station receives a response, then the process returns to monitoring KPIs at 1140 to determine if any increase in random access failure rates result.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

What is claimed is:

1. A method for handling a bogus Physical Random Access Channel (PRACH) signal in a wireless network, the method comprising:
    obtaining network measurement data collected by a wireless network element, the network measurement data including a Key Performance Indicator (KPI) used by the network to evaluate performance or data collected during a quiet time; and
    determining whether a bogus PRACH signal is present in the network by examining the network measurement data with respect to a first reference information,
    wherein the network measurement data is the KPI, the method further comprising:
    instructing at least one network element to not transmit in PRACH frequencies at a predetermined quiet time;
    collecting data received in the PRACH frequencies during the quiet time; and
    analyzing the data received in the PRACH frequencies to determine whether the bogus PRACH signal is present.

2. The method of claim 1, further comprising, when the bogus PRACH is present:
    determining whether a frequency assignment (FA) for PRACH frequencies is available, and
    when the FA is available, applying the FA to the PRACH frequencies.

3. The method of claim 1, further comprising, when the bogus PRACH is present:
    determining whether a frequency assignment (FA) for PRACH frequencies is available, and
    when the FA is not available, splitting control channel bandwidth into at least two different frequency bands and assigning the PRACH frequencies to the at least two frequency bands.

4. The method of claim 1, wherein analyzing the data comprises:
    comparing the data received in the PRACH frequencies to data of known bogus PRACH signals.

5. The method of claim 4, further comprising:
    when a detected bogus PRACH signal is present that is not one of the known bogus PRACH signals, blacklisting the detected bogus PRACH signal.

6. The method of claim 1, wherein the KPI is at least one of a cell throughput, a PRACH detection failure rate, a PRACH random access failure rate, and a PUCCH utilization.

7. The method of claim 1, further comprising:
when the bogus PRACH signal is determined to be present, locating a source of the bogus PRACH signal.

8. A system for handling a bogus Physical Random Access Channel (PRACH) signal in a wireless network, the system comprising:
a processor; and
a non-transitory computer readable medium with computer executable instructions stored thereon which, when executed by the processor, perform a method comprising:
obtaining network measurement data collected by a wireless network element, the network measurement data including a Key Performance Indicator (KPI) used by the network to evaluate performance or data collected during a quiet time; and
determining whether a bogus PRACH signal is present in the network by examining the network measurement data with respect to a first reference information,
wherein the network measurement data is the KPI, the method further comprising:
instructing at least one network element to not transmit in PRACH frequencies at a predetermined quiet time;
collecting data received in the PRACH frequencies during the quiet time; and
analyzing the data received in the PRACH frequencies to determine whether the bogus PRACH signal is present.

9. The system of claim 8, wherein the system includes a Jamming Detection and Location Server and the non-transitory computer readable medium is provided in the Jamming Detection and Location Server.

10. The system of claim 9, wherein the Jamming Detection and Location Server receives the network measurement data from at least one base station of the wireless network.

11. The system of claim 8, wherein the method further comprises, when the bogus PRACH is present:
determining whether a frequency assignment (FA) for PRACH frequencies is available, and
when the FA is available, applying the FA to the PRACH frequencies.

12. The system of claim 8, wherein the method further comprises, when the bogus PRACH is present:
determining whether a frequency assignment (FA) for PRACH frequencies is available, and
when the FA is not available, splitting control channel bandwidth into at least two different frequency bands and assigning the PRACH frequencies to the at least two frequency bands.

13. The system of claim 8, wherein analyzing the data comprises:
comparing the data received in the PRACH frequencies to data of known bogus PRACH signals.

14. The system of claim 13, wherein the method further comprises:
when a detected bogus PRACH signal is present that is not one of the known bogus PRACH signals, blacklisting the detected bogus PRACH signal.

15. The system of claim 8, wherein the KPI is at least one of a cell throughput, a PRACH detection failure rate, a PRACH random access failure rate, and a PUCCH utilization.

16. The system of claim 8, wherein the method further comprises:
when the bogus PRACH signal is determined to be present, locating a source of the bogus PRACH signal.

17. A method for handling a bogus Physical Random Access Channel (PRACH) signal in a wireless network, the method comprising:
obtaining network measurement data collected by a wireless network element, the network measurement data including a Key Performance Indicator (KPI) used by the network to evaluate performance or data collected during a quiet time;
determining whether a bogus PRACH signal is present in the network by examining the network measurement data with respect to a first reference information; and
when the bogus PRACH is present:
determining whether a frequency assignment (FA) for PRACH frequencies is available, and
when the FA is available, applying the FA to the PRACH frequencies.

* * * * *